United States Patent
Yoshikawa et al.

[11] Patent Number: 5,089,907
[45] Date of Patent: Feb. 18, 1992

[54] POST-OBJECTIVE TYPE OPTICAL SCANNER AND IMAGE FORMING APPARATUS USING THE SAME

[75] Inventors: Motonobu Yoshikawa, Nishinomiya; Yoshiharu Yamamoto, Osaka, both of Japan

[73] Assignee: Matsushita Electric Industrial Co., Ltd., Osaka, Japan

[21] Appl. No.: 642,419

[22] Filed: Jan. 17, 1991

[30] Foreign Application Priority Data

Jan. 17, 1990 [JP] Japan .................................. 2-7418

[51] Int. Cl.$^5$ .............................................. G02B 26/10
[52] U.S. Cl. ................................. 359/206; 359/217
[58] Field of Search .................... 350/6.7, 6.8, 6.91

[56] References Cited

U.S. PATENT DOCUMENTS

| | | | |
|---|---|---|---|
| 4,818,046 | 4/1989 | Kondo | 350/6.8 |
| 4,852,957 | 8/1989 | Nakimoto et al. | 350/6.6 |
| 4,873,435 | 10/1989 | Ono et al. | 250/235 |
| 4,915,465 | 4/1990 | Sugiura | 350/6.5 |
| 4,982,205 | 1/1991 | Hasegawa | 346/108 |
| 5,031,979 | 7/1991 | Itabashi | 350/6.8 |

Primary Examiner—Frank Gonzalez
Attorney, Agent, or Firm—Pollock, VandeSande & Priddy

[57] ABSTRACT

A high-resolution post-objective type optical scanner in which a beam of light is scanned by an optical deflector onto a scanning surface after it is converged by a condensing lens, the light beam converged on the scanning surface having a spot size with an intensity of $1/e^2$ and not exceeding 80 μm over the entire area of the scanning surface. The optical deflector includes a reflecting surface composed of a cylindrical surface or a spherical surface. A compensating lens disposed between the optical deflector and the scanning surface has a power which varies in the scanning direction between a central portion and a peripheral portion of the compensating lens. The distance r between an axis of rotation of the optical deflector and a deflecting point, the distance L between the deflecting point and the scanning surface, and an effective scanning width $Y_O$ are related by the relationship $r \geq -0.025 \times L + 0.1 \times Y_o + 1.4$. An image forming apparatus using post-objective type optical scanner is also disclosed.

3 Claims, 5 Drawing Sheets

(a)

(b)

POST-OBJECTIVE TYPE OPTICAL SCANNER AND IMAGE FORMING APPARATUS USING THE SAME

BACKGROUND OF THE INVENTION

1. Field of the Invention:

The present invention relates generally to optical scanners for use in laser printers, for example, and more particularly to a post-objective type optical scanner including an optical deflector for scanning a beam after it is converged by a condensing lens, and also to an image forming apparatus using such post-objective type optical scanner.

2. Description of the Prior Art:

Most of the conventional optical scanners used in laser printers are of the pre-objective type. The pre-objective type optical scanners include a condensing lens disposed downstream of an optical deflector, so that the curvature of field or the $f\theta$ characteristic can be easily compensated by means of the condensing lens. The pre-objective type optical scanners, however, require a large condensing lens and are complicated in construction and hence costly to manufacture. Furthermore, since the pre-objective type optical scanners need a long optical path which makes it difficult to minimize the overall size of the optical scanners. In recent years, post-objective type optical scanners including a condensing lens disposed upstream of an optical deflector have been put into the research development and practical use for the purpose of realizing a compact and low-cost optical scanner.

One example of such conventional post-objective type optical scanners is disclosed in Japanese Patent Laid-open Publication No. 1-169422. In the disclosed post-objective type optical scanner, the reflecting surface of an optical deflector is composed of a cylindrical surface or a spherical surface so as to compensate the curvature of field in the scanning direction. Further, a compensating lens disposed between the optical deflector and a scanning surface has a power in the sub-scanning direction which varies in the scanning direction between the center and the periphery so as to compensate the curvature of field in the subscanning direction. With this construction, however, due to the aberration caused, it is difficult to form, over the entire area of the scanning surface, a spot size with an intensity of $1/e^2$ (e=base of natural logarithm) which is not exceeding $80\mu m$. With this difficulty, the resolution of the known post-objective type optical scanner is a relatively low.

SUMMARY OF THE INVENTION

With the foregoing drawbacks of the prior art in view, it is an object of the present invention to provide a post-objective type optical scanner which is inexpensive to manufacture, compact in construction and capable of forming a spot size with $1/e^2$ intensity which is not exceeding $80\mu m$.

Another object of the present invention is to provide an image forming apparatus using such post-objective type optical scanner.

A post-objective type optical scanner of the present invention comprises a laser, a condensing lens for converging a beam of light emitted by the laser, a cylindrical lens for converging a light beam coming from the condensing lens, onto a reflecting surface only in a sub-scanning direction, an optical deflector having the reflecting surface and rotatable for deflecting the light beam coming from the cylindrical lens, the reflecting surface being one of a cylindrical surface and a spherical surface, a compensating lens for converging the light beam onto a scanning surface after it is deflected by the optical deflector, the compensating lens having a power in the sub-scanning direction which varies in a scanning direction between a central portion and a peripheral portion of the compensating lens, and a photosensitive drum lying in the scanning surface. The distance r between an axis of rotation of the optical deflector and a deflecting point, the distance L between the deflecting point and the scanning surface, and an effective scanning width $Y_0$ are related by the relationship $r \geq -0.025 \times L + 0.1 \times Y_0 + 1.4$.

The reflecting surface of the optical deflector which is composed of the cylindrical surface or the spherical surface is effective to compensate the curvature of field in the scanning direction. Furthermore, since the power of the compensating lens which is disposed between the optical deflector and the scanning surface varies in the scanning direction between the center and the periphery of the compensating lens, the curvature of field in the subscanning direction is also compensated.

A simulation indicated that an inradius of the cylindrical reflecting surfaces that form deflecting surfaces was closely related to a spot size of the light beam converged on the entire area of the scanning surface. It was proved the fact that if the arrangement of other components remains unchanged, the spot size on the scanning surface decreases with an increase in inradius of the deflecting surfaces.

The present inventors found that a considerable reduction of the aberration and formation of a spot size with $1/e^2$ intensity and not exceeding $80\mu m$ over the entire area of the scanning surface are possible when the distance r between an axis of rotation of the optical deflector and a deflecting point, the distance L between the deflecting point and the scanning surface, and an effective scanning width $Y_0$ are related by the relationship $r \geq -0.025 \times L + 0.1 \times Y_0 + 1.4$. In cases where the foregoing relationship is not established, images formed on a peripheral portion of the scanning surface involve a great amount of aberration, thus making it difficult to provide a high resolution.

An image forming apparatus using the optical scanner of this invention is compact in size and inexpensive to manufacture, and has a high resolution.

The above and other objects, features and advantages of the present invention will become more apparent from the following description when making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

The present invention will be described below in detail with reference to a preferred embodiment shown in the accompanying drawings.

Figure 1:
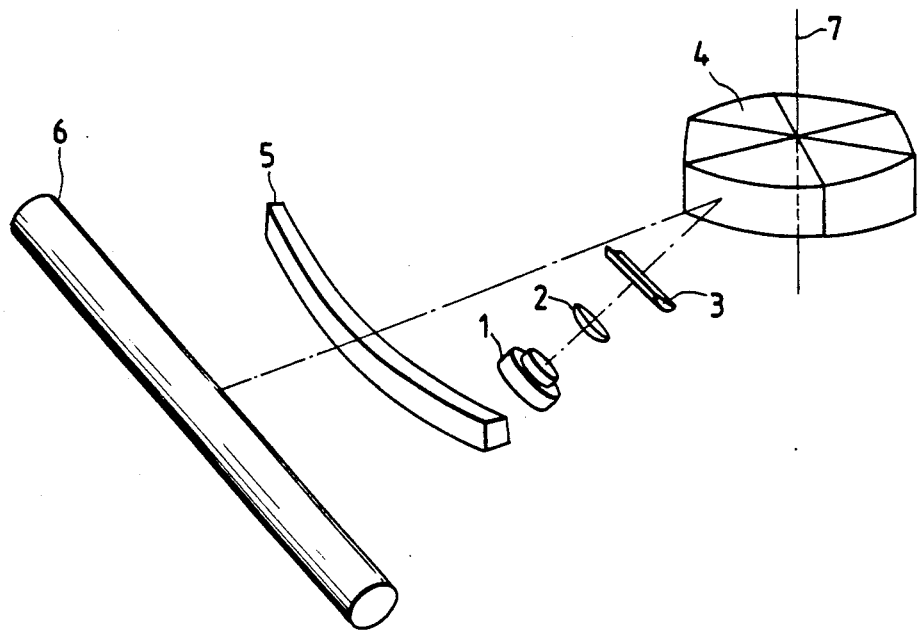
FIG. 1 is a schematic perspective view showing the general construction of a post-objective type optical scanner according to the present invention.

FIG. 1 shows the general construction of a postobjective optical scanner according to this invention. In this post-objective optical scanner, a beam is converged in the sub-scanning direction in the vicinity of the reflecting surface of an optical deflector. The power in the subscanning direction is, therefore, substantially constant regardless of whether the reflecting surface is a cylindrical surface or a spherical surface. Consequently, in either case the operation takes place in the same manner. In the illustrated embodiment, the reflecting surface is composed of a cylindrical surface.

Figure 3:
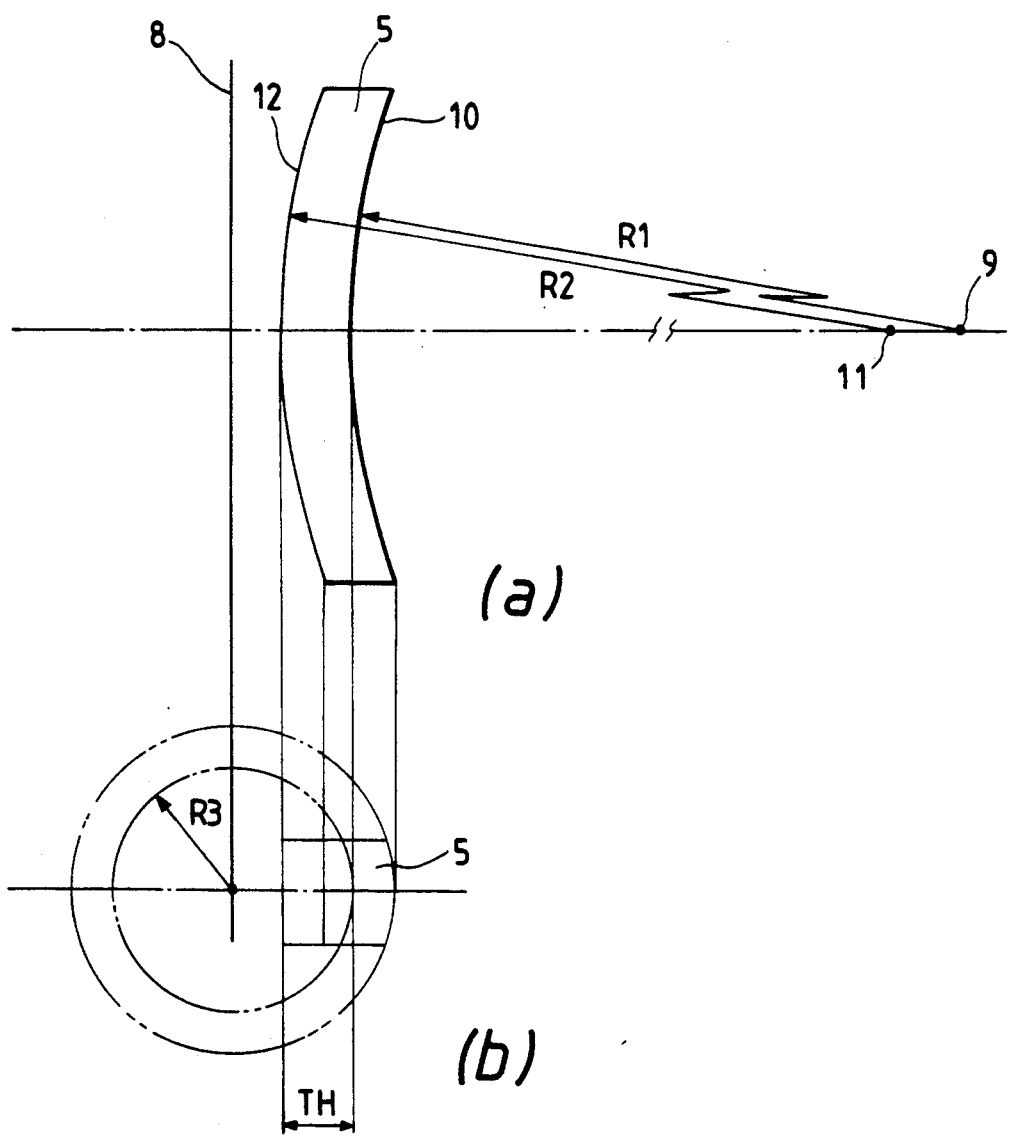
FIG. 3(a) is a top plan view showing the horizontal shape and configuration of a compensating lens of the optical scanner.
FIG. 3(b) is a side view showing the vertical shape and configuration of the compensating lens.

As shown in FIG. 1, the post-objective optical scanner generally comprises a semiconductor laser 1, a condenser lens 2 for condensing (i.e. converging) a beam of light emitted from the semiconductor laser 1, a cylindrical lens 3 for converging the light beam from the condensing lens 2 onto a reflecting surface only in a sub-scanning direction, a polygonal mirror 4 composed of cylindrical surfaces serving as reflecting surfaces for reflecting the light beam coming from the cylindrical lens 3 while the polygonal mirror 4 is rotating about an axis 7 of rotation, a compensating lens 5 having a shape and configuration shown in FIGS. 3(a) and 3(b) for converging the light beam onto a scanning surface after the light beam is reflected by the polygonal mirror 4, and a photosensitive drum 6 lying in the scanning surface.

In FIG. 3(a), 8 is a rotation symmetrical axis which lies in a plane extending parallel to a scanning direction and containing an optical axis and hence is parallel to the scanning direction. Reference numeral 9 denotes a point on the optical axis. Designated by 10 is a rotation symmetrical surface obtained by rotating an arc of a radius R1 about the rotational symmetrical axis 8, the arc of the radius R1 being disposed in a plane lying parallel to the scanning direction about the point 9 on the optical axis. Reference numeral 11 denotes an axis intersecting the optical axis and perpendicular to a plane parallel to the scanning direction, and 12 is a cylindrical surface having a radius of curvature R2 and extending about the axis 11, the cylindrical surface 12 being perpendicular to the plane parallel to the scanning direction. In FIG. 3(b), R3 denotes a distance between the rotational symmetrical surface 10 and the rotational symmetrical axis 8 on the optical axis, and TH denotes a thickness at the center of the compensating lens 5.

Operation of the post-objective type optical scanner of the foregoing construction will be described below with reference to FIGS. 4(a) and 4(b), in which r is a distance between the rotational axis 7 of the optical deflector (i.e. the polygon mirror 4) and the deflecting point, R is a radius of curvature of the cylindrical reflecting surface, L is a distance between the deflecting point and the scanning surface, $Y_0$ is an effective scanning width, and D is a distance between the output surface of the compensating lens 5 and the photosensitive drum 6.

Figure 5:
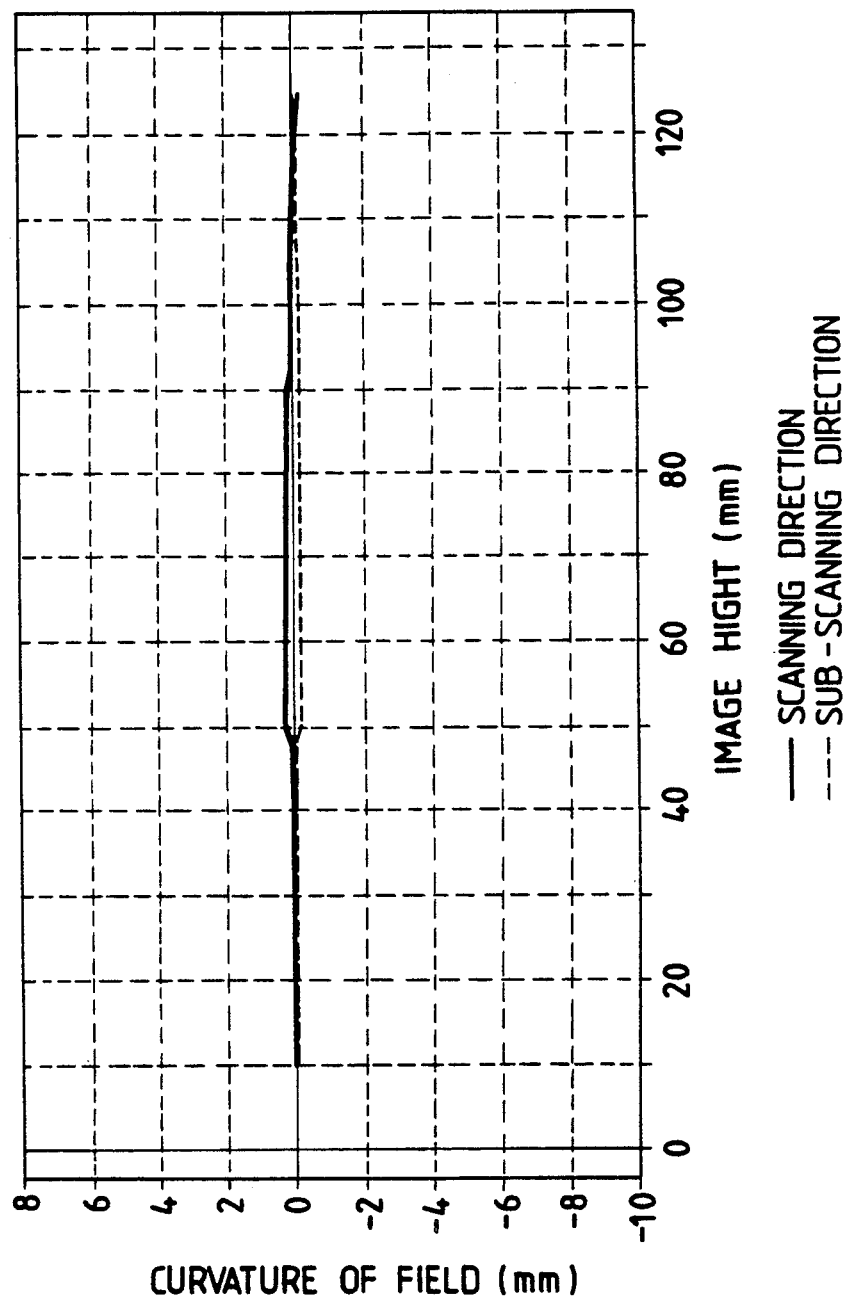
FIG. 5 is a graph showing the optical performance of the optical scanner of this invention.

A beam of light emitted from the semiconductor laser 1 is changed by the condensing lens 2 into a converging light beam which in turn is incident upon the cylindrical lens 3. Subsequently, the light beam is converged at a point adjacent to the cylindrical reflecting surface of the polygonal mirror 4 so far as the sub-scanning direction is concerned. The laser beam incident upon the polygonal mirror 4 is deflected by the cylindrical surfaces of the polygonal mirror 4 and subsequently converged by the compensating lens 5 onto the photosensitive drum 6. Since the polygonal mirror 4 is rotating about the rotational axis 7, the laser beam is scanned over the photosensitive drum 6. The compensating lens 5 is disposed such that the deflecting point and the scanning surface on the photosensitive drum 6 are geometrical optically conjugate together in the sub-scanning direction. With this arrangement of the compensating lens 5, the tilt of surface of the polygonal mirror 4 is compensated. Additionally, since the power of the compensating lens 5 in the sub-scanning direction varies to gradually decrease in the scanning direction from the center toward the periphery of the compensating lens 5, the curvature of field in the sub-scanning direction can be compensated. As appears clear from FIG. 5, the curvature of field of the present optical scanner is sufficiently compensated both in the scanning direction and in the sub-scanning direction.

As described above, the curvature of field in the scanning direction can be compensated by using the polygonal mirror 4 composed of cylindrical surfaces as an optical deflector, while the curvature of field can be compensated by the compensating lens 5 without exerting negative influence on the image-formation in the scanning direction.

Figure 6:
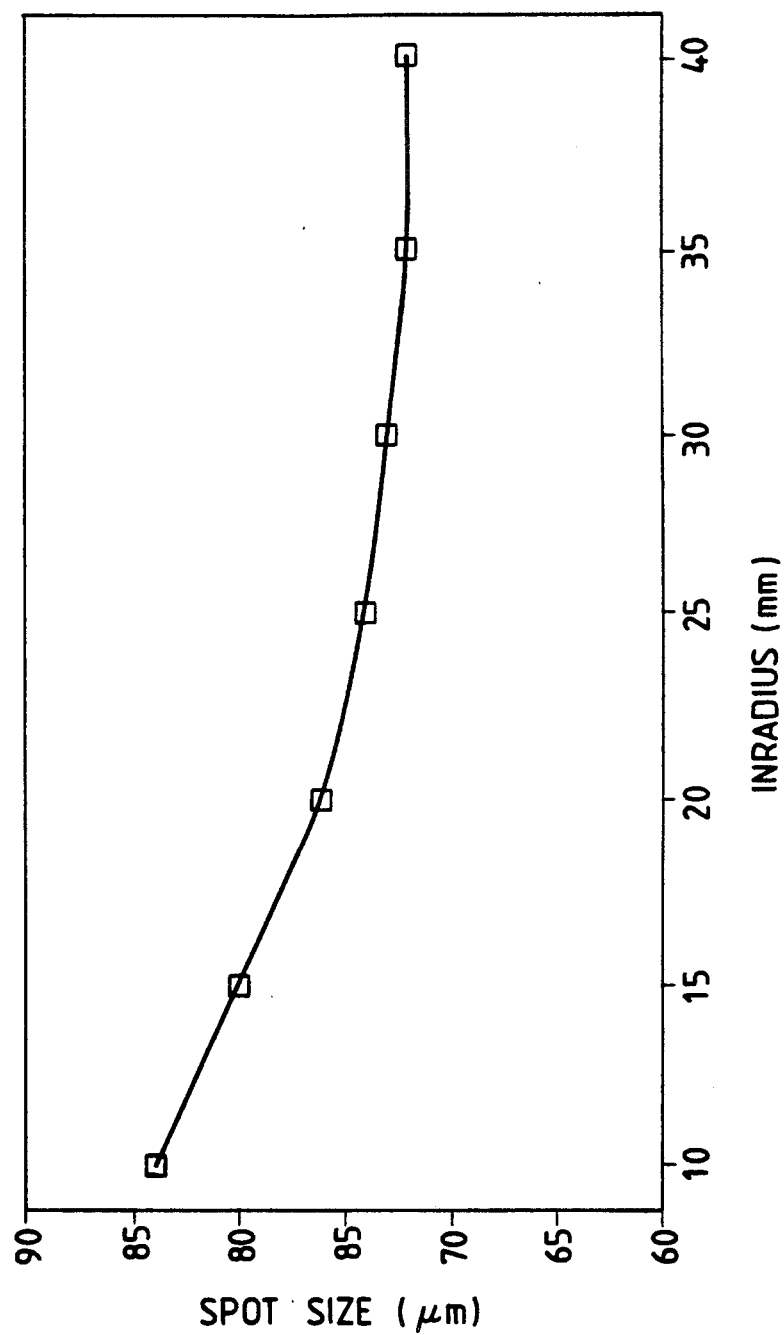
FIG. 6 is a graph illustrative of the relationship between the inradius of a deflecting surface and the spot size.

It was proved by a simulation that the inradius of the cylindrical reflecting surfaces which constitute deflecting surfaces was closely related to the spot size of the laser beam formed on the entire area of the scanning surface. FIG. 6 shows the relationship between the inradius and the spot size which is obtained when the arrangement of other components are kept unchanged. As evidenced by FIG. 6, the spot size on the scanning surface becomes smaller with increasing amount of the inradius of the deflecting surfaces. The present inventors discovered the fact that a high resolution resulting from a substantial reduction of the aberration and also resulting from the formation of a spot size with $1/e^2$ intensity and not exceeding 80μm over the entire area of the scanning surface, can be obtained when a condition indicated by the following expression (1) is satisfied.

$$r \geq -0.025 \times L + 0.1 \times Y_0 + 1.4 \qquad (1)$$

where r is the distance between the axis of rotation of the optical deflector and the deflecting point, L is the distance between the deflecting point and the scanning surface, and $Y_0$ is the effective scanning width. In the case where the foregoing condition is not satisfied, images formed on the periphery of the scanning surface contain a great amount of aberration, thereby lowering the resolution.

Figure 4:
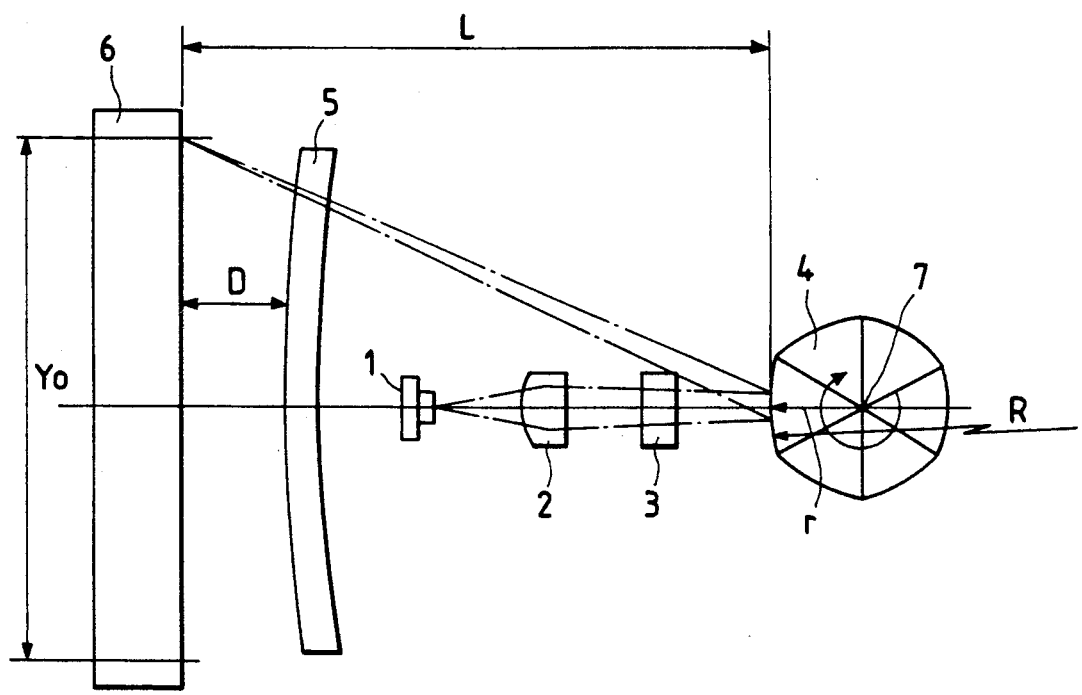
FIG. 4(a) is a diagrammatical view illustrative of a light path in the scanning direction.
FIG. 4(b) is a view similar to FIG. 4(a), but showing the light path in the sub-scanning direction.
Figure 4:
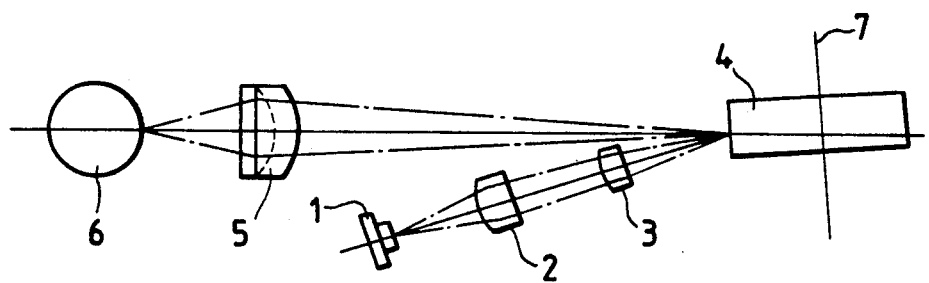

Dimensional details of particular examples of the present optical scanner are shown in Tables 1 through 4, in which r, R, L, YO and D are as shown in FIG. 4(a)

and R1, R2, R3 and TH are as shown in FIGS. 3(a) and 3(b).

TABLE 1

| Y₀ | L | R | r | D | R1 | R2 | R3 | TH |
|---|---|---|---|---|---|---|---|---|
| 216 | 230 | 196.0 | 25.0 | 65.0 | 648.5 | 648.5 | 23.58 | 8.0 |

TABLE 2

| Y₀ | L | R | r | D | R1 | R2 | R3 | TH |
|---|---|---|---|---|---|---|---|---|
| 216 | 210 | 164.6 | 17.8 | 56.5 | 607.6 | 607.6 | 21.06 | 8.0 |

TABLE 3

| Y₀ | L | R | r | D | R1 | R2 | R3 | TH |
|---|---|---|---|---|---|---|---|---|
| 216 | 200 | 168.0 | 20.0 | 56.5 | 554.0 | 554.0 | 20.61 | 8.0 |

TABLE 4

| Y₀ | L | R | r | D | R1 | R2 | R3 | TH |
|---|---|---|---|---|---|---|---|---|
| 216 | 180 | 166.6 | 23.3 | 56.5 | 453.1 | 453.1 | 19.55 | 8.0 |

Figure 2:
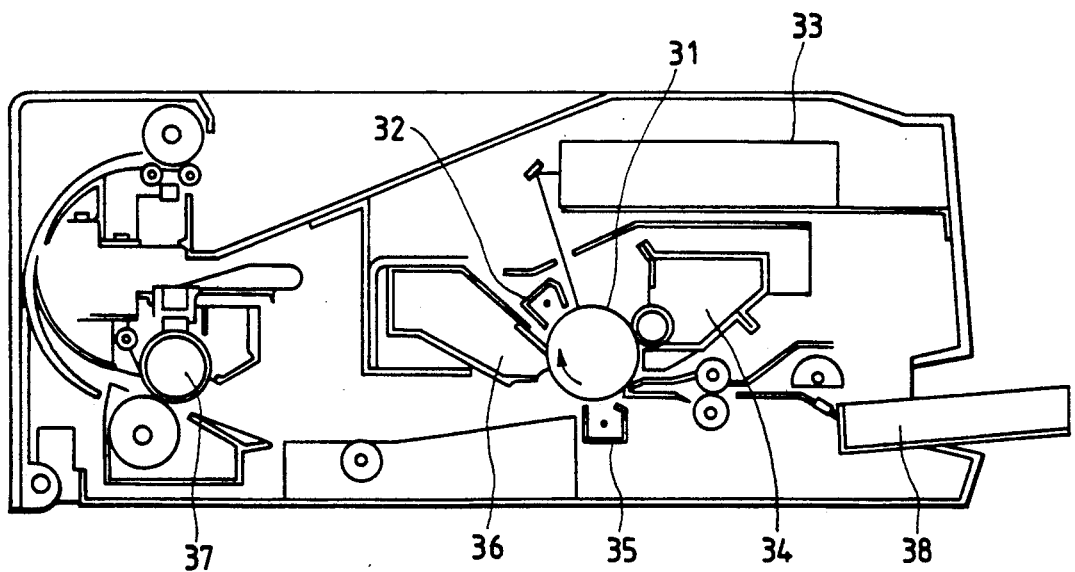
FIG. 2 is a diagrammatical view showing an image forming apparatus using the post-objective type optical scanner.

FIG. 2 shows an image forming apparatus in which the optical scanner of the illustrated embodiment is incorporated.

As shown in FIG. 2, the image forming apparatus includes a photosensitive drum 31 having a peripheral surface coated with a photosensitive body whose charge changes upon exposure to light, a corona charging unit 32 for adhering electrostatic ions to the photosensitive surface of the drum 31 to thereby charging the same, an optical scanner 33 (identical to the optical scanner of the illustrated embodiment described above) for writing recorded printing data onto the photosensitive surface of the drum 31, a developer unit 34 for causing a charged toner to adhere to patterns of printing data on the photosensitive surface of the drum 31, a corona transfer unit 35 for transferring a toner image remaining on the photosensitive drum 31 to paper, a cleaner 36 for removing an excess amount of toner from the photosensitive surface of the drum 31, a print fixing unit 37 for fixing the toner which has been transferred to the paper, and a paper feed cassette 38 for supplying sheets of paper one at a time toward the photosensitive drum 31.

The image forming apparatus incorporating the optical scanner of the foregoing embodiment is compact, can be manufactured at a low cost and has a high resolution.

Obviously various minor changes and modifications of the present invention are possible in the light of the above teaching. It is therefore to be understood that within the scope of the appended claims the invention may be practiced otherwise than as specifically described.

What is claimed is:

1. A post-objective type optical scanner comprising:
a laser;
a condensing lens for converging a beam of light emitted by said laser;
a cylindrical lens for converging a light beam coming from said condensing lens, onto a reflecting surface only in a sub-scanning direction;
an optical deflector having said reflecting surface and rotatable for deflecting said light beam coming from said cylindrical lens, said reflecting surface being one of a cylindrical surface and a spherical surface; and
a compensating lens for converging said light beam onto a scanning surface after it is deflected by said optical deflector, said compensating lens having a power in said sub-scanning direction which varies in a scanning direction between a central portion and a peripheral portion of said compensating lens, said light beam converged on said scanning surface having an intensity of $1/e^2$ and a spot size not exceeding $80\mu m$, and
said optical deflector having an axis of rotation, a deflecting point at which said light beam is reflected, and an effective scanning width $Y_0$, wherein a distance r between said axis of rotation and said deflecting point, a distance L between said deflecting point and said scanning surface and said effective scanning width $Y_0$ are related by the relationship $r \geq -0.025 \times L + 0.1 \times Y_0 + 1.4$.

2. A post-objective type optical scanner according to claim 1, said compensating lens having one surface on which said light means is incident and an opposite surface from which said light beam outgoes, said one surface being a rotation symmetrical surface which is obtained by rotating an arc about a rotation symmetrical axis lying in a plane extending parallel to said scanning direction and containing an optical axis, said arc being disposed in a plane lying parallel to said scanning direction about a point on said optical axis, said opposite surface being a cylindrical surface so configured as to cancel a power in said scanning direction at said one surface, said compensating lens being disposed between said optical deflector and said scanning surface.

3. An image forming apparatus using the post-objective type optical scanner of claim 1.

* * * * *